United States Patent
Meyers et al.

(10) Patent No.: US 7,822,415 B2
(45) Date of Patent: Oct. 26, 2010

(54) IN-FLIGHT TRANSCEIVER AND LOCATOR SYSTEM

(75) Inventors: Thomas Daniel Meyers, Scottsdale, AZ (US); Christopher Richard Thorne, Columbia, MD (US); Philipp Lynn Hulcher, Gaithersburg, MD (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 541 days.

(21) Appl. No.: 11/592,008

(22) Filed: Nov. 2, 2006

(65) Prior Publication Data

US 2007/0298786 A1 Dec. 27, 2007

Related U.S. Application Data

(60) Provisional application No. 60/733,268, filed on Nov. 2, 2005.

(51) Int. Cl.
H04W 4/00 (2009.01)
H04B 7/185 (2006.01)
G01S 1/00 (2006.01)

(52) U.S. Cl. .................. 455/431; 455/12.1; 342/357.1

(58) Field of Classification Search ................ 455/431, 455/12.1; 342/357.1
See application file for complete search history.

(56) References Cited

U.S. PATENT DOCUMENTS

| | | | | |
|---|---|---|---|---|
| 4,649,396 A | * | 3/1987 | Friedman | 343/705 |
| 5,309,474 A | * | 5/1994 | Gilhousen et al. | 370/209 |
| 5,835,069 A | * | 11/1998 | Skoog | 343/765 |
| 5,872,777 A | * | 2/1999 | Brailean et al. | 370/349 |
| 5,920,278 A | * | 7/1999 | Tyler et al. | 342/33 |

(Continued)

FOREIGN PATENT DOCUMENTS

DE 10 2004 016 548 10/2005

(Continued)

OTHER PUBLICATIONS

Ron Holm, Why convert to a SAASM-based Gobal Positioning System?, Oct. 2005, Military Embedded Systems.*

(Continued)

*Primary Examiner*—Vincent P Harper
*Assistant Examiner*—TImothy Pham
(74) *Attorney, Agent, or Firm*—Morgan, Lewis & Bockius LLP

(57) ABSTRACT

Military systems in particular face two specific problems: field casualties typically increase as unit visibility decreases and it is often difficult for ground stations and/or headquarters to maintain control and visibility of geographically dispersed assets. The system provides satellite communications such as two-way messaging, Voice over Packet, and global positioning information and reporting for fixed and rotary wing aircrafts where traditional methods of communications are not otherwise practical. The system provides communications between remote users and other remote users as well as between remote users and control stations. In some embodiments there is an in-flight transceiver system that includes an antenna, an aviation box, and a switch. The aviation box conforms to a one-half, ½ short Air Transport Rack (ATR) form factor and includes a transceiver, an interface card, and a global positioning system (GPS) unit. The switch is located between the aviation box and the antenna for controlling a data signal between the antenna and the transceiver of the aviation box.

30 Claims, 5 Drawing Sheets

U.S. PATENT DOCUMENTS

| | | | |
|---|---|---|---|
| 6,121,922 A | 9/2000 | Mohan | 342/357.1 |
| 6,163,681 A * | 12/2000 | Wright et al. | 455/66.1 |
| 6,353,730 B1 * | 3/2002 | Buettner et al. | 340/7.1 |
| 6,683,605 B1 * | 1/2004 | Bi et al. | 345/211 |
| 6,720,801 B2 * | 4/2004 | Houlberg | 327/108 |
| 6,799,094 B1 * | 9/2004 | Vaida et al. | 701/3 |
| 7,006,032 B2 * | 2/2006 | King et al. | 342/29 |
| 7,053,767 B2 * | 5/2006 | Petite et al. | 340/531 |
| 7,131,136 B2 * | 10/2006 | Monroe | 725/105 |
| 7,236,778 B2 * | 6/2007 | Schreiber | 455/423 |
| 2002/0024965 A1 * | 2/2002 | Lee | 370/419 |
| 2002/0089434 A1 | 7/2002 | Ghazarian | 340/988 |
| 2002/0173888 A1 * | 11/2002 | Shelton et al. | 701/35 |
| 2002/0177476 A1 | 11/2002 | Chou | 455/574 |
| 2004/0029615 A1 * | 2/2004 | Gerry et al. | 455/560 |
| 2004/0117611 A1 * | 6/2004 | Huber et al. | 713/150 |
| 2004/0183673 A1 | 9/2004 | Nageli | 340/539.13 |
| 2004/0246104 A1 | 12/2004 | Baechtiger et al. | 340/10.41 |
| 2005/0038601 A1 | 2/2005 | Dentinger et al. | 701/213 |
| 2005/0060339 A1 * | 3/2005 | McGee | 707/102 |
| 2005/0076034 A1 | 4/2005 | Addonisio et al. | 707/10 |
| 2005/0143005 A1 * | 6/2005 | Moore, III | 455/13.1 |
| 2006/0141930 A1 * | 6/2006 | Keen et al. | 455/12.1 |
| 2007/0031150 A1 * | 2/2007 | Fisher et al. | 398/128 |
| 2007/0130599 A1 * | 6/2007 | Monroe | 725/105 |

FOREIGN PATENT DOCUMENTS

EP    1 406 207    4/2004

OTHER PUBLICATIONS

Barry Evans, Satellite Communication System, Publication Date: Jan. 1999; ISBN: 085296899X, Third Edition, p. 486.*

* cited by examiner

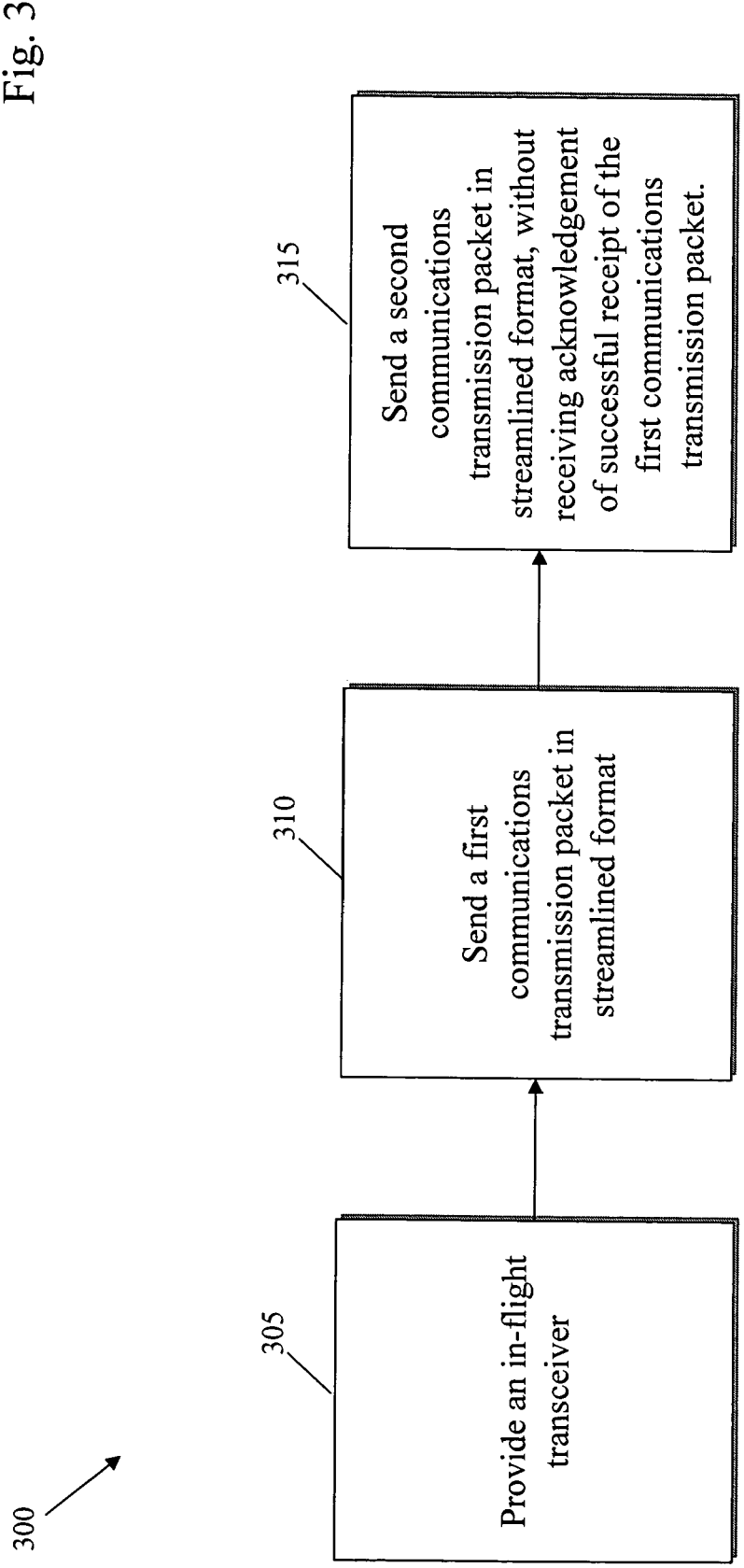

IN-FLIGHT TRANSCEIVER AND LOCATOR SYSTEM

CROSS-REFERENCE TO RELATED APPLICATION

This application claims priority to and the benefit of, and incorporates herein by reference, in its entirety, provisional U.S. patent application Ser. No. 60/733,268, filed Nov. 2, 2005.

FIELD OF THE INVENTION

The present invention relates generally to transceiver systems and specifically to in-flight transceiver and locator systems.

BACKGROUND

Current attempts at in-flight transceiver and locator systems are bulky and do not provide real-time data updates. Specifically, systems are not typically small enough to fit inside an aircraft's cockpit and the data exchanged between transceiver, satellite, ground units and/or headquarters experience delays of ten seconds or more. In a battlefield scenario, even mere seconds are crucial. Additionally, due to space constraints, the housing that encases components of an in-flight transceiver and locator system typically provides limited connectivity to users or engineers and mechanics attempting to service the system.

SUMMARY OF THE INVENTION

Problems encountered with previous technology are overcome by the present technology which can quickly send and receive messages and information between an in-flight transceiver system and a ground unit. Omni-directional data communications are achieved at significant data rates under widely varying conditions, including substantially all naturally occurring weather and environmental conditions. Further, the information transmitted at these rapid transmission rates can be secured, e.g., by using encryption techniques such as Triple Data Encryption Standard (DES) algorithms, Advanced Encryption Standard (AES) algorithms, Rivest Shamir Adleman (RSA) algorithms, any combination of these and/or spread-spectrum techniques.

The technology relates to an in-flight transceiver system for communicating secured information at a high data rate between an in-flight unit and a ground unit. The in-flight transceiver system includes an antenna and an aviation box, which typically includes a transceiver, an interface card, and a global positioning system (GPS) unit. The GPS unit optionally including a selective availability anti-spoofing module (SAASM) unit. Preferably, the in-flight transceiver system also includes a switch between the aviation box and the antenna for controlling signal traffic between the antenna and the transceiver. This switch is useful to protect the circuitry of the transceiver by isolating signals being transmitted from signals being received. In some embodiments, the in-flight transceiver system also includes a signal booster such as a Low Noise Amplifier (LNA) between the aviation box and the antenna as a subcomponent of the switch. In some embodiments, the signal booster or LNA will be located close to the antenna to ensure that the original signal without additional noise is amplified. In some embodiments the antenna is a dual-pole antenna, is omni-directional, and/or is fin-shaped, residing on the exterior of the aircraft. Beneficially communications between ground stations and aircraft incorporating the in-flight transceiver system are almost never lost due to the omni-directional nature of the antenna.

The in-flight transceiver system can be used on an aircraft for communicating with stationary land-based ground unit (s). Using software and communications techniques described below, data transmission rates of about 800 bits/second from the in-flight transceiver system to the ground unit can be achieved, and transmission rates of about 2800 bits/second can be achieved from the ground unit(s) to the in-flight transceiver system.

Data transmitted by the in-flight transceiver system can be bidirectional between the in-flight unit and the ground unit, e.g., each unit can send and receive information. In some implementations, data is transmitted or received in half-duplex, e.g., data is either transmitted or received, but both do not occur at the same time. Other implementations operate in full-duplex and can transmit and/or receive simultaneously. Data transmissions to and from the in-flight unit may come from any direction because of the omni-directional capabilities of the antenna, and the transmissions between ground units and in-flight transceiver systems can be secured by using encryption such as Triple Data Encryption Standard (DES) algorithms, Advanced Encryption Standard (AES) algorithms, Rivest Shamir Adleman (RSA) algorithms, any combination of these, such as a Triple Data Encryption Standard (DES) algorithm and an Advanced Encryption Standard (AES) algorithm, or a DES algorithm and a Rivest Shamir Adleman (RSA) algorithm, or an AES algorithm and an RSA algorithm, and/or spread spectrum techniques.

The in-flight transceiver system is manufactured to be operable in a number of aviation environmental factors, such as vibration, salt, fog, temperatures between minus twenty-six (−26) degrees Centigrade and plus seventy-one (+71) degrees Centigrade, aircraft voltage transients, and external electromagnetic forces. In some embodiments the aviation box mounts within a rack sized with a one-half, ½ short Air Transport Rack (ATR) form factor, e.g., a ½ short ATR form factor is approximately twelve (12) inches deep and the aviation box is one-half of the ½ short ATR, i.e., approximately six (6) inches deep. The packaging also complies with the many other aviation-related certifications. The in-flight transceiver system preferably operates over L Band satellite communication channels such as MSAT, INMARSAT, Thuraya, Artemis, ACeS, and/or OPTUS.

In some embodiment the in-flight transceiver system comprises an interface for data connections. In some versions there is an interface for a servicing data connector and an in-flight data connector. The in-flight data connecter is connected, typically via a cable, to the aircraft. Connecting a laptop computer to the servicing data connector, via a cable, automatically disables the in-flight data connector. Conversely, disconnecting the servicing data connector automatically enables the in-flight data connector. Typical prior art systems limit the number of data connections available to reduce the size of the necessary form factor. Often one data connection is provided and a servicing technician will unplug the data connection running to the aircraft before the service technician is able to connect his servicing laptop. The in-flight transceiver system, however, provides additional interfaces for a service technician to connect to the in-flight transceiver system to diagnose device or communications problems. The aviation's platform's data connection is disabled while a technician is connected, but in the event the technician is rushed (for example, is on the battlefield), he does not have to remember to reconnect the aircraft's data connection as in prior art systems; rather once the service technician unplugs his service laptop the aircraft's data connection is enabled.

There is also a method for communicating between an in-flight transceiver system and a ground unit. The method includes providing at least one of the embodiments of the in-flight transceiver system described above and sending a communications packet over a communications channel that is not previously allocated or predetermined. In some embodiments, the transceiver software determines the receive channel by searching a prioritized list of channels that have been configured as part of a provisioning process. In embodiments that utilize this method of channel selection, there is a transmit frequency associated with the configured receive channel. Additionally or alternatively, in some embodiments, the transceiver software determines the receive channel by searching the entire configured frequency space in frequency steps. These frequency steps are typically configurable. If using this method to select the channel, the transceiver listens on the receive channel for instructions, e.g., configuration messages, on how to set the correct transmit frequency. This feature provides for great versatility in the adaptability of the system. Once a channel is identified, a first packet is transmitted from the ground unit to the in-flight transceiver system. In some embodiments the reverse occurs; once a channel is identified a first packet is transmitted from the in-flight transceiver system to the ground unit. The size of the packet transmitted is typically small, allowing for maximal transmission over minimal bandwidth. Next, a second packet is transmitted, either before an acknowledgement is returned for the first packet or without the sending party requesting successful receipt of the first communications packet. While in some versions, the second packet is sent over the same channel as the first packet, in some versions the second packet is sent over a channel that is not the same channel used by the first packet. Transmitting the packets over different channels results in increased system robustness because even if a packet on one channel is intercepted, the second packet avoids detection, thus preventing re-construction of the sent message. As the number of packets transmitted increases, the robustness of the system increases because packets are spread over several channels. By repeating these steps, exceptionally high rates of data transmission can be achieved. Test results have shown that the receipt rate of the transmitted packets by intended recipients is high, with a success rate on the order of 90% or more. In contrast, other systems that employ an acknowledgement request suffer unnecessary and burdensome loads on communications bandwidth that causes system inefficiencies. Beneficially, in embodiments of the present invention, acknowledgement requests and/or receipts are omitted.

In another embodiment, the transceiver is Blue Force Tracking-capable. Blue Force Tracking is a communications system linking satellites, sensors, vehicles and weapons into a single, seamless, digital network-a system. In some of these embodiments, voice messages are sent on a different channel than other data messages. The voice messages are sent in packet form, for example as Voice over Packet (VoP) transmissions. In some embodiments the data messages are also sent in packet form over a Blue Force Tracking-capable transceiver.

In some embodiments, the transmission packets are secured by using encryption and/or spread spectrum techniques, regardless if the packets are sent from the in-flight transceiver system to the ground unit or from the ground unit to the in-flight transceiver system (or both). Some encryption techniques utilized are Triple Data Encryption Standard (DES) algorithms, Advanced Encryption Standard (AES) algorithms, Rivest Shamir Adleman (RSA) algorithms, or combinations of these. Data rates from the in-flight unit to the ground unit are typically at or above about 800 bits per second; data rates from the ground unit to the in-flight unit are typically at or above about 2800 bits per second.

Transmission of the at least some of the communications transmission packets can be via code divided multiple access (CDMA), or other known or proprietary protocols. Preferably, User Data Program (UDP) or Internet Protocol (IP) protocols are not used or loaded on the system. Beneficially, by eliminating excess protocols such as UDP and IP, higher system data transmission rates are achieved since packet data does not include unnecessary routing information or overhead. Transmitted data can include information relating to global positioning (GPS), two-way text messages, voice communications, status of digital input/output signals, maps, photos, video, task orders, targeting data, computer programs, software, cryptographic keys, provisioning files, and/or others. In some embodiments, communications are sent over L band satellite communications channels such as MSAT, INMARSAT, Thuraya, Artemis, ACeS, and/or OPTUS. More specifically, transmissions from the in-flight transceiver system are sent to a satellite, from which they are relayed to the ground unit. Similarly, ground unit transmissions can be sent to an in-flight unit with an in-flight transceiver system by being relayed through a satellite.

In some implementations, the in-flight transceiver system provides beyond line of sight (BLOS) communications. Additionally, the in-flight transceiver system provides access to the Army Battle Command System (ABCS), which employs fixed and/or semi-fixed installations and mobile networks, and Global Command and Control System-Army (GCCS-A) that are otherwise unavailable to the aircraft. Additionally, in some embodiments, the in-flight transceiver system enables aircraft in an underserved theater of operations to have a rudimentary air traffic control capability.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 3 depicts a method for communicating between an in-flight transceiver system and a ground unit.

DETAILED DESCRIPTION

The system provides satellite communications such as two-way messaging and position reporting for fixed and rotary wing aircrafts, where traditional methods of communications are not otherwise practical. The system keeps remote users connected to other remote users and to control stations and provides location visibility. This functionality solves two specific problems for military applications: it reduces the number of casualties by having a means of receiving/sending critical information quickly and securely, and maintains better control and visibility of geographically dispersed vehicles, soldiers, and other assets.

The in-flight transceiver system is developed specifically to meet BlueForce Tracking Aviation's requirements. Specifically, the system operates under temperature extremes and Electromagnetic Interference protection is provided. As such, the system meets the Aviation Applied Technology Directorate's (AATD) test for airworthiness, MIL-STD-810—environmental engineering considerations and laboratory tests, e.g., MIL-STD-810F, Sections of 6.1 such as Temp/Altitude, High Temperature Operation, Low Temperature Operation, High Temperature Storage, Low Temperature Storage, Fungus, Salt Fog, Blowing Dust, Blowing Sand, Solar Radiation, Rain, Blowing Rain, Resonance Survey, Random Vibration—Ground Vehicle, Sine-on-Random Vibration, Gunfire Vibration, Functional Shock, Crash Hazard Shock, Bench Handling Shock, Humidity, Temperature Shock, Explosive Atmosphere, Non-Operational Low Pressure (Altitude), Transit Drop Shock, Icing Freezing Rain, and/or others, and MIL-STD-461—electromagnetic interference characteristics requirements for equipment, e.g., CE101—conducted emissions, Power Leads, CS101—Conducted Susceptibility, Power Leads, RE101—Antenna Terminal, RS101—Susceptibility, CE102, RE102, RS103, RS103 Out-of-Band Rejection, RS103 Burnout, CE106, CS114, CS115, CS116, Test Report (EMC). Additionally the system meets the requirements of FCC Part 15, FCC Part 25, ETSI EN 301-681, ETSI EN 301-426, and ETSI EN 301-489.

Figure 1A:
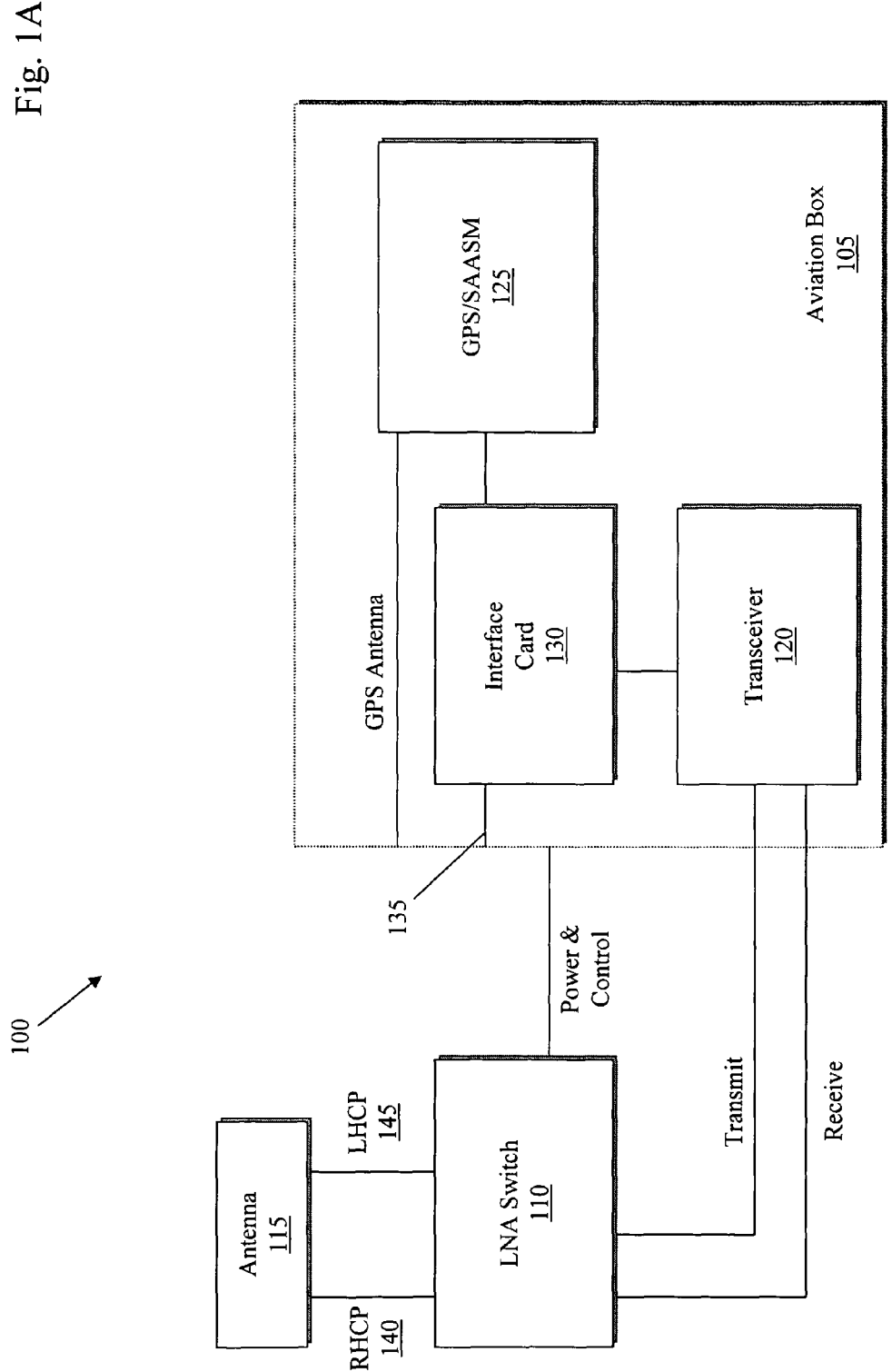
FIG. 1 depicts an implementation of a messaging system incorporating the transceiver.
FIG. 1B depicts a frontal view of one implementation of the aviation box 105 of FIG. 1A which provides varying ports for connections.
FIG. 1C depicts an external view of an implementation of the in-flight transceiver system components.

FIG. 1A depicts an implementation of the in-flight transceiver system 100 and enjoys several benefits due to its configuration and size. The in-flight transceiver system 100 includes an aviation box 105, a low noise amplifier ("LNA") 110 or signal booster switch, and an antenna 115, all in signal communication. In some implementations the in-flight system uses two antennas rather than one. The aviation box 105, contains a transceiver 120, a GPS/SAASM unit 125 and an optionally an interface card 130. Typically the aviation box 105 resides inside the aircraft, e.g., a helicopter. The antennas 115 typically reside on the exterior of the aircraft. For the aviation box 105 to fit into a small form factor, e.g., one-half, ½ short ATR (approximately six (6) inches), the antenna 115 is located outside of the aviation box 105 as well as the aircraft. In some embodiments, the antenna 115 is located not less than 15 feet from the aviation box. In some embodiments, the antenna 115 is located not less than 30 feet from the aviation box. Beneficially, the LNA switch 110 boosts the signal between the antenna 115 and the aviation box 105, overcoming the signal loss in the cable connecting the aviation box 105 to the antenna 115. Additionally the aviation box incorporates a mobile transceiver module 120. In one embodiment the mobile transceiver module 120 is a MTM-202 transceiver produced by Comtech Mobile Datacom, Corp., of Germantown, Md. Additionally, the antenna 115 fits the aerodynamic requirements of the aircraft. The benefit is that robust communications, GPS, and transceiver functionality can be provided in a form factor that fits easily within an aircraft where space is at a premium and additional weight is discouraged.

The aircraft is able to communicate securely with ground units, base stations and other aircraft via the in-flight transceiver system 100. The aircraft is signally connected to a data interface 135 located on the exterior of the aviation box 105. The data from the aircraft is sent via a port 135, via the interface card 130 (if present) to the transceiver 120 and/or GPS/SAASM unit 125. The data is then communicated from the aviation box 105 through the LNA switch 110 to the antenna 115 located on the exterior of the aircraft. From the antenna 115, data is communicated to a communications and/or GPS satellite. When receiving information the reverse occurs: data is received at the antenna 115, passes through the LNA 110 where the signal is amplified, the signal is received by the transceiver 120, is communicated to the interface card 130 and/or GPS/SAASM unit 125, and transmitted via a port 135 on the exterior of the aviation box 105 to the aircraft. Examples of ports 135 on the exterior of the aviation box 105 are described with respect to FIG. 1B. The in-flight transceiver system 100 sends communication over a standard L Band satellite communication channel to communicate with a satellite as described above. Additionally, the in-flight transceiver system 100 is operable under various aviation environmental conditions, such as vibration, salt fog, varying temperatures, e.g., between minus twenty-six (−26) degrees Centigrade and plus seventy-one (+71) degrees Centigrade, aircraft voltage transients, altitude, air pressure, blowing dust and sand, solar radiation, fungus, rain, blowing rain, freezing rain, transit drop, explosive atmosphere, radiated, external electromagnetic forces, and conducted emissions.

In a preferred implementation, the antenna 115 is a fin-shaped antenna that preferably resides on the exterior of the aircraft. In some implementations the antenna 115 is a dual-pole antenna and includes a right hand circularly polarized (RHCP) antenna 140 and a left hand circularly polarized (LHCP) antenna 145. This allows the antenna 115 to tune communications sent using either signal polarization. In some implementations one antenna 115 may be adjusted to act as a RHCP antenna or a LHCP antenna. If there is only one antenna 115, a switch may be used to determine the direction of the polarization. In one embodiment, the LNA switch 110 may be used to determine the polarization of the antenna. In addition, the antenna 115 has omni-directional capabilities so that the antenna can receive communications originating from any direction and not just communications specifically aimed at the antenna 115.

In some implementations, the LNA switch 110 is connected to the antenna(s) 115 and boosts the signal received by the antenna(s) 115 when forwarding the antenna's signal to the aviation box 105. Boosting the signal allows the antenna (s) 115 to have a wire between the antenna(s) 115 and the aviation box 105 that is longer in length than is achievable for a connection without a signal boosting LNA 110. Optionally, the LNA switch 110 controls signal traffic between the antenna 115 and the aviation box 105. For example, the LNA switch 110 advantageously instructs the receiver in the transceiver 120 to cease receiving while the transmitter in the transceiver 120 is transmitting. In addition to being connected to the antenna 115, the LNA switch 110 is also connected to the aviation box 105 via transmit and receive connections. In some implementations the connections are a single cable, e.g., a serial connection, a copper wire, or the like. In these implementations typically a control signal instructs the LNA 110 if a transmit or receive command is being sent from the transceiver 120 to the LNA switch 110. In a preferred implementation, however, the transmit and receive connections between the LNA switch 110 and the aviation box 105 are separate connections. Regardless of single or dual connections, a control signal may also be provided to the LNA switch 110 by the aviation box 105 if RHCP or LHCP is to be used when sending or receiving a transmission. Additionally the aviation box 105 includes a power and control line connected to the LNA switch 105. Typically electrical power provided by aircrafts undergoes dips and surges. Beneficially power to the LNA box 110, transceiver 120 and/or the GPS/SAASM unit 125 can be conditioned by the interface card 130 within the aviation box 105 to prevent power surges or dips from damaging the circuitry of the respective components.

The interface card 130 in the aviation box 105 provides several connections for the in-flight transceiver system 100. In some versions the interface card 130 provides connections between the transceiver 120, ports 135 on the exterior of the aviation box 105, and the GPS/SAASM 125 using wiring harnesses with latching connectors. Additionally, the interface card 130 provides serial interface converters to convert from serial connections found on the exterior of the aviation box 105 to bus connections with the transceiver and 120 and GPS/SAASM 125. In some implementations the interface card 130 receives power via a connection 135 on the exterior of the aviation box 105 from the aircraft and provides power supply conditioning of approximately an input range of about +10 to about +32 VDC for the other components of the in-flight transceiver system 100 such as the transceiver 120 and LNA switch 110. In some embodiments, power conditioning for the transceiver 120 involves a step-down conversion to +12 VDC. The power supplied to the LNA switch 110 is a step down conversion to about +8 VDC.

In one implementation, the aviation box has an RS-422 interface and a RS-232 interface on the exterior of the aviation box (optionally connected to the interface card 130). The RS-422 interface is useful for connecting the aviation box 105 to communication systems, computers, e.g., Force XXI Battle Command, Brigade-and-Below (FBCB2) computers, and/or navigation systems of the aircraft. The RS-232 interface is useful for connecting a laptop computer as a diagnostic tool to the aviation box 105. In some implementations the aviation box 105 may have an auto-detect feature that recognizes if connections are made to either the RS-422 interface or the RS-232 interface. In some versions, the auto-detect functionality disregards connections to one of the serial connections other based on software logic executing on a processor typically associated with the transceiver 120 within the aviation box 105. In one implementation, the auto-detect feature of the software logic instructs the aviation box 105 to ignore commands from the RS-422 interface if a laptop or diagnostic tool is connected to the RS-232 interface. In another implementation, the software logic will instruct the aviation box 105 to multiplex between the RS-232 interface and the RS-422 interface.

In some implementations, the aviation box 105 also provides connections 135 on the exterior of the aviation box 105, via the interface card 130, for external capabilities to provide enhanced functionality. In some implementations there is an interface that accepts a cryptographic "fill" wherein secure cryptographic keys and/or data are provided to the aviation box 105 for encrypting/decrypting and/or encoding/decoding transmissions. In some implementations there is an interface that accepts external GPS data and/or functionality. For example, in some versions, the GPS/SAASM 125 unit provides commercial-level accuracy, e.g., accurate location information within thirty (30) to one hundred (100) meters. In some of these implementations, WAAS and/or military-grade GPS data/functionality can be supplied to the aviation box via a connector 135 on the exterior of the aviation box 105. WAAS and/or military-grade GPS is accurate within three (3) meters. In some implementations, external GPS is unnecessary because the GPS/SAASM unit 125 provides WAAS-level accuracy.

In some implementations, the GPS unit 125 is SAASM-capable. SAASM allows for satellite authentication, over-the-air rekeying, and contingency recovery, features typically available with the similar, but older PPS-SM system. SAASM systems allow for updating with an encrypted "Black Key" that may be transmitted over unclassified channels. SAASM-enabled receivers can also acquire encrypted Y-code directly from satellite, without relying on local radio signals. By utilizing SAASM the GPS unit 125 provides increased security, reliability, and/or speed of communication.

In some embodiments, the GPS/SAASM unit 125 utilizes a dedicated external GPS antenna interface 175 provided via the exterior ports 135 of the aviation box 105. The transceiver 120 interfaces to the GPS/SAASM unit 125 internal to the aviation box 105, via the interface card 130, using a GPS serial connection. In some versions, the GPS/SAASM unit 125 provides a dedicated cryptographic key port on the exterior of the aviation box 105 for cryptographic fills. In some embodiments the GPS/SAASM unit 125 provides autonomous positioning to the aircraft. In some implementations the GPS/SAASM unit 125 provides position reporting via FBCB2 messages.

The transceiver 120 of the aviation box 105 sends/receives text messages, location data, maps, photos, video, task orders, targeting data, computer programs, software, cryptographic keys, provisioning files, and other communications to/from the antenna 115. In one version, the transceiver is assigned unique radio identifier. In some of these versions, a customizable node name is associated with and/or assigned to the unique radio identifier for easy reference by computers, e.g., the aircraft's computers or computers at a ground station, or by humans, either operators of the aircraft the in-flight transceiver system 100 is located in or by units and/or ground stations communicating with the aircraft. In one embodiment the transceiver 120 switches to Voice over BlueForce Tracking (voice over packet) upon initiation and/or detection of voice traffic. Upon completion of the voice communication, the transceiver switches back to general BlueForce Tracking mode. In one embodiment, there is a processor (not shown) for the transceiver 120 that processes commands from the GPS/SAASM unit 125 Application Programming Interface (API). The transceiver 120 beneficially allows communications systems, computers, e.g., FBCB2 computers, and navigation systems of the aircraft to utilize and/or provide commands to the transceiver, e.g., acting as a data modem, to communicate with satellites, other in-flight and/or ground units, and/or base stations.

In one embodiment the aviation box 105 has three light-emitting diode (LED) lights on the exterior of the box 105. A first LED indicates when the aviation box has a connected power supply. The second LED indicates when the transceiver 120 has locked onto a satellite. The third LED indicates when the transceiver 120 is transmitting. In some embodiments LED lights are additionally located remotely from the aviation box 105. In these embodiments the LED lights are mounted or positioned on the dashboard of the cockpit or flight area, and the aviation box 105 is located in another part of the aircraft. Typically a cable harness connects the aviation box 105 and the LED lights.

Figure 1B:
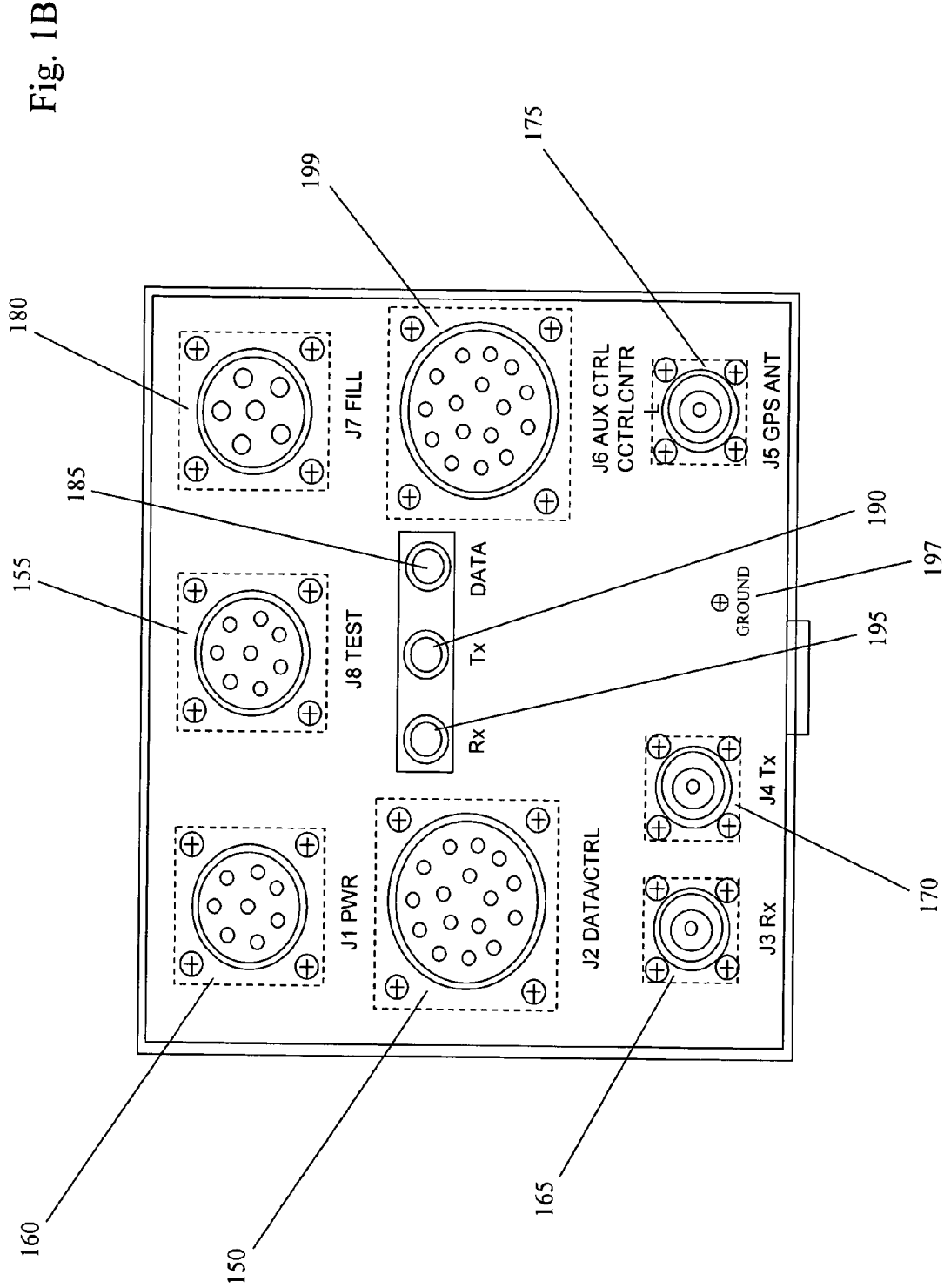

FIG. 1B depicts a frontal view of one implementation of the aviation box 105 of FIG. 1A which provides varying ports 135 for connections. In some implementations, the aviation box 105 provides multiple serial interfaces for a mechanic or engineer to interface with the in-flight transceiver system 100. A typical implementation provides two serial data interfaces, a data/control interface 150 to be connected to the aircraft in which the system resides, and one serial interface to act as a service and/or test interface 155. A mechanic or engineer can connect a diagnostic tool, e.g., a laptop computer, to the service/test interface while the aircraft interface remains connected to the aircraft. In some prior art devices, there is only one data interface, thereby requiring a service technician connecting a laptop or diagnostic tool to unplug the cable connected to the aircraft. Thus, the dual-serial interface of the present technology is beneficial by reducing the service time required by reducing or eliminating the number of connections a mechanic or engineer has to restore after servicing the system. In some implementations, the mechanic or engineer only needs to unplug the laptop or diagnostic tool at the end of service because the aircraft interface remains connected throughout the servicing period. Also depicted in FIG. 1B are the power interface 160, where the aviation box is connected to the aircraft's power supply, a receive interface 165 for receiving data from the antenna 115, a transmit interface 170 for transmitting data to the antenna 115, and an interface 175 for an external GPS antenna. Also provided is an interface 180 for cryptographic fills and indicator LEDs 185, 190, 195. In some implementations the LEDs represent data 185, e.g., the host is ready for API activity, transmitting 190, and receiving 195. In some embodiments an electrical ground lug 197 is provided. Typically also provided is an auxiliary control interface 199. The auxiliary control interface 199 is typically used to provide data for remote LEDs. In some implementations, the auxiliary control interface 199 provides a zeroize function used to remove, delete and/or eliminate the cryptographic keys used by the system 100.

Figure 1C:
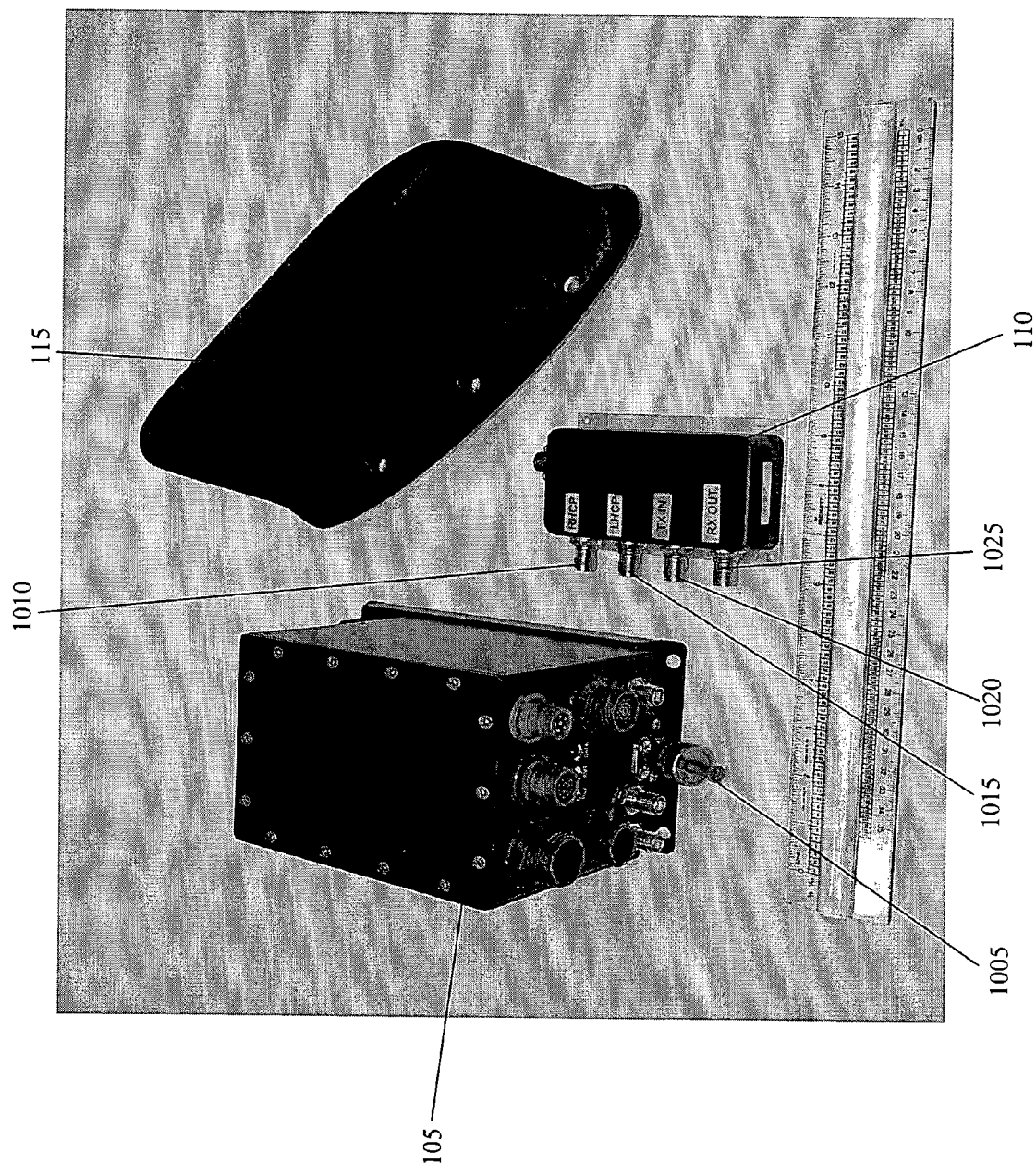

FIG. 1C depicts an external view of an implementation of the in-flight transceiver system 100 components. Depicted are the aviation box 105, the LNA switch 110, and a fin-shaped implementation of the antenna 115. As depicted, the aviation box in addition to the ports described with respect to FIG. 1B, additionally has a connector 1005 to anchor the aviation box to a shock mount. The LNA switch 110 provides an RHCP interface 1010 for the RHCP antenna 140, an LHCP interface 1015 for the LHCP antenna 145, an TX In interface 1020 that receives transmission data from the transmit port 170 of the aviation box 105, and a RX Out interface 1025 that sends data received via the antenna 115 to the receive port 165 on the aviation box 105.

Figure 2:
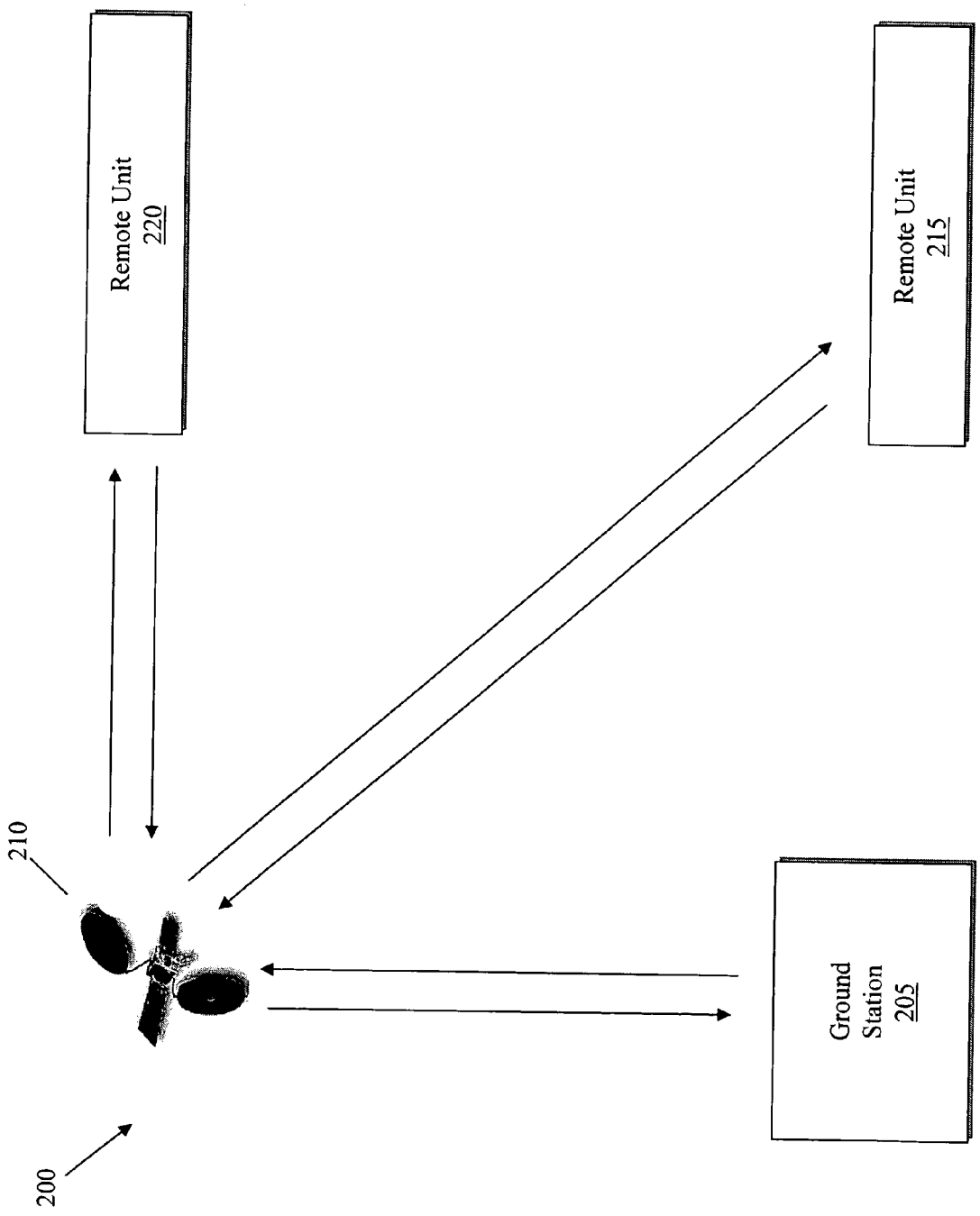
FIG. 2 depicts an implementation of the in-flight transceiver system.

FIG. 2 depicts an implementation of a messaging system 200 wherein in-flight units utilize the in-flight transceiver system 100 for communications. In one embodiment, a ground station 205 is in two-way communication with a satellite 210. In addition to the ground station 205 being in two-way communication with the satellite, remote units 215 and 220 are also in two-way communication with the satellite. In some versions, the remote units 215, are ground-based units, e.g., a truck or personnel carrier. In some versions remote units 220 are air-based units, e.g., 220, a helicopter and/or airplane.

In some implementations GPS information is sent between remote units 215, 220 and the ground station 205. Additionally or alternatively, the remote units 215, 220 also exchange communications and/or text-messages directly. The GPS and/or text messages typically include status information of the sending unit such as current power consumption, orientation, payload information, heading, velocity, logistical, operational, and other situational awareness (SA) and/or command and control (C2) information. The text messages may also comprise user-defined or user-provided messages, e.g., "send help," "inventory low," and others. The ground station 205 sends communication packets using a streamlined, low overhead protocol over an L Band communications channel such as MSAT, INMARSAT, Thuraya, Artemis, ACeS, and/or OPTUS. Optionally, the transmission packets are transmitted using CDMA protocols.

The two-way communications between the remote units 215, 220 and the ground station 205 or between two remote units 215, 220 occur in substantially real-time, e.g., between three to five seconds. The messaging system 200 is beneficial in that it allows rapid communication between the ground station 205 and the remote units 215, 220 (typically approximately 800 bits per second from the in-flight unit to the ground unit and approximately (about) 2800 bits per second from the ground unit to the in-flight unit).

FIG. 3 depicts a method 300 for communicating between an in-flight unit utilizing 305 an in-flight transceiver system 100 and a ground unit. A communications packet is sent 310 to the ground unit in a streamlined format, e.g., low overhead, via a signal connection with a satellite over an L Band channel such as MSAT, INMARSAT, Thuraya, Artemis, ACeS, and/or OPTUS. A second packet in then sent 315, also via a signal connection with a satellite, after the first packet. Sending 315 the second packet, however, can occur irrespective of any acknowledgement request or response regarding successful receipt the first packet by the ground unit. Beneficially, the data rate of communication packets also increases by sending communication packets this way. In some implementations the data transmission and receiving functions are operate in half-duplex, e.g., data is sent or received, but both do not occur at the same time. Additionally, data transmissions are typically encrypted and secured using cryptography, e.g., RSA, DES, etc., and/or spread spectrum techniques. In some implementations, beneficially, the entire packet is encrypted, not just the data. Advantageously, sending low-overhead packets, irrespective of acknowledgement of previous packets increases data rate and real-time accuracy of messages.

Beneficially, the sequence described above applies to a communication traveling from the ground unit, via satellite, to the in-flight unit as well. In some implementations, the streamlined format does not use defined or pre-allocated communication channels, but rather selects from a prioritized list of channels that have been configured as part of a provisioning process. As such, network efficiency that would normally be lost due to set up and teardown of a communications channel is regained and usable to transmit communication data. In one embodiment, a first communication packet is sent 310 on one channel and a second, subsequent packet is sent 315 on a second, different channel. For example, in some versions, the first packet is sent over an Inmarsat channel and the second packet is sent over a Thuraya channel. Beneficially, in some implementations, sending the packets over different channels is based on the data being sent, e.g., Blue-Force Tracking data is sent over the Inmarsat channel and Voice over Packet information is sent over the Thuraya channel. Additionally, the method depicted in FIG. 3 does not utilize extraneous data packet protocols, e.g., Universal Datagram Packets (UDP), nor does the streamlined format allow for Internet Protocol (IP) packets. The data rate over existing communication networks increases by limiting the types of traffic on the network because much of the processing overhead used in conventional networking architectures is eliminated. Beneficially, in implementations where satellite services are leased and/or rented based on the amount of data transmitted and/or received, the optimizations of the protocol utilized also provide a significant cost savings due to the removal of excess extraneous protocol information.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube), LED (Light Emitting Diodes), or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a ground server, data server, and/or a middleware component, e.g., an application server, and/or a front-end component, e.g., a client computer having a graphical user interface, or any combination of such back-end, middleware, or front-end components. The components of the system can be interconnected by any form or medium of digital data communication, e.g., a communication network. Examples of communication networks include a satellite network, a local area network ("LAN"), and/or a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers or devices and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. An in-flight transceiver system for communicating an information securely at a high data rate between an in-flight unit and a ground unit comprising:
    an antenna;
    an aviation box conforming to a one-half, half short Air Transport Rack (ATR) form factor comprising a transceiver and a global positioning system (GPS) unit;
    a switch between the aviation box and the antenna for controlling a data signal between the antenna and the transceiver, and
    an interface comprising a servicing data connector and an in-flight data connector coupled to the in-flight unit wherein connecting a cable to the servicing data connector automatically disables the in-flight data connector,
    wherein the transceiver operates at a data rate of greater than approximately 800 bits per second (bps) when sending information from the in-flight unit to the ground unit and greater than approximately 2800 bps when receiving information at the in-flight unit from the ground unit, and
    wherein the information from the in-flight unit to the ground unit and the information from the ground unit to the in-flight unit is packet encrypted using a Triple Data Encryption Standard (DES) algorithm and an Advanced Encryption Standard (AES) algorithm, or a DES algorithm and a Rivest Shamir Adleman (RSA) algorithm, or an AES algorithm and an RSA algorithm.

2. The in-flight transceiver system of claim 1 further comprising an interface card.

3. The in-flight transceiver system of claim 1 wherein the GPS unit comprises a selective availability anti-spoofing module (SAASM).

4. The in-flight transceiver system of claim 1 further comprising a signal booster between the aviation box and the antenna.

5. The in-flight transceiver system of claim 1 wherein the antenna is located outside a body of an aviation platform and wherein the aviation box is located inside the body of the aviation platform.

6. The in-flight transceiver system of claim 5 wherein the antenna is located at a distance of not less than 15 feet from the aviation box.

7. The antenna of claim 1 wherein the antenna is fin-shaped.

8. The in-flight transceiver system of claim 1 wherein the antenna is a dual-pole antenna.

9. The in-flight transceiver system of claim 1 wherein the antenna is an omni-directional antenna.

10. The in-flight transceiver system of claim 1 wherein the information is communicated bidirectionally between the in-flight unit and the ground unit.

11. The in-flight transceiver system of claim 1 wherein the in-flight transceiver system is operable in at least one environmental condition comprising vibration, salt fog, or temperatures between minus twenty-six (−26) degrees Centigrade and plus seventy-one (+71) degrees Centigrade, aircraft voltage transients, and external electromagnetic forces.

12. The in-flight transceiver system of claim 1 wherein the traffic is transmitted over an L Band satellite communication channel.

13. The in-flight transceiver system of claim 1 wherein disconnecting the servicing data connector automatically enables the in-flight data connector.

14. The in-flight transceiver system of claim 1 wherein the transceiver is Blue Force Tracking-capable.

15. The in-flight transceiver system of claim 1 wherein the transceiver is operable to send and receive Voice over Packet transmissions.

16. The in-flight transceiver system of claim 1 wherein the transceiver is assigned unique radio identifier.

17. The in-flight transceiver system of claim 16 wherein a customizable node name is associated with the unique radio identifier.

18. The in-flight transceiver system of claim 1 wherein the information is communicated beyond-line-of-sight.

19. A method for securely communicating between a first party and a second party comprising:
   providing to the second party an in-flight transceiver system comprising:
      an antenna;
      an aviation box conforming to a one-half, half short Air Transport Rack (ATR) form factor comprising a transceiver and a global positioning system (GPS) unit;
      a switch between the aviation box and the antenna for controlling a data signal between the antenna and the transceiver; and
      an interface comprising a servicing data connector and an in-flight data connector coupled to the in-flight transceiver wherein connecting a cable to the servicing data connector automatically disables the in-flight data connector;
   sending a first independent communications packet over a first communications channel that is not allocated or predetermined; and
   sending a second independent communications packet over a second communications channel before receiving acknowledgement of successful receipt of the first communications packet, wherein the first and second communications packets are sent between the first and second party,
   wherein the transceiver operates at a data rate of greater than approximately 800 bits per second (bps) when sending the first or second independent communications packet from the second party to the first party and greater than approximately 2800 bps when receiving the first or second independent communications packet at the second party from the first party, and
   wherein at least one of the first or second communications packets is packet encrypted using a Triple Data Encryption Standard (DES) algorithm and an Advanced Encryption Standard (AES) algorithm, or a DES algorithm and a Rivest Shamir Adleman (RSA) algorithm, or an AES algorithm and an RSA algorithm.

20. The method of claim 19 wherein the first party is a ground station unit and the second party is an in-flight remote unit.

21. The method of claim 19 wherein the first party is a remote ground unit and the second party is an in-flight remote unit.

22. The method of claim 19 wherein the first channel and the second channel are the same channel.

23. The method of claim 19 wherein the first channel and the second channel are different channels.

24. The method of claim 19 wherein at least one of the first or second communications packets is a Voice over Packet communications packet that utilizes the BlueForce Tracking system.

25. The method of claim 19 wherein at least one of the first or second communications packets are transmitted using code divided multiple access (CDMA) protocols.

26. The method of any of claims 19 wherein at least one of the first or second communication packets includes at least one of GPS information, text message information, or voice communications.

27. The method of claim 19 wherein the first channel and the second channel are L Band satellite communication channels.

28. The method of claim 19 wherein the transceiver is assigned unique radio identifier.

29. The method of claim 28 wherein a customizable node name is associated with the unique radio identifier.

30. The method of claim 19 wherein sending the first and second communication packets offers beyond-line-of-sight communications.

* * * * *